United States Patent
Chen et al.

(10) Patent No.: US 10,678,456 B2
(45) Date of Patent: Jun. 9, 2020

(54) STORAGE CAPACITY USAGE MANAGEMENT

(71) Applicant: INTERNATIONAL BUSINESS MACHINES CORPORATION, Armonk, NY (US)

(72) Inventors: Duo Chen, Shanghai (CN); Da Liu, Shanghai (CN); Min Fang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/146,234

(22) Filed: Sep. 28, 2018

(65) Prior Publication Data

US 2020/0104065 A1    Apr. 2, 2020

(51) Int. Cl.
*G06F 3/06* (2006.01)

(52) U.S. Cl.
CPC .......... *G06F 3/0631* (2013.01); *G06F 3/0607* (2013.01); *G06F 3/0647* (2013.01); *G06F 3/0653* (2013.01); *G06F 3/0665* (2013.01); *G06F 3/0689* (2013.01); *G06F 2206/1012* (2013.01)

(58) Field of Classification Search
CPC .... G06F 3/0665; G06F 3/0608; G06F 3/0644; G06F 3/0689; G06F 12/02; G06F 3/0647; G06F 3/0631; G06F 12/023; G06F 2206/1012; G06F 3/0683
See application file for complete search history.

(56) References Cited

U.S. PATENT DOCUMENTS

| | | | |
|---|---|---|---|
| 9,817,766 B1* | 11/2017 | Si | G06F 3/061 |
| 2016/0011811 A1 | 1/2016 | Garson et al. | |
| 2017/0220261 A1* | 8/2017 | Krishnamurthy | G06F 3/0608 |
| 2017/0242592 A1 | 8/2017 | Camp et al. | |
| 2017/0300236 A1 | 10/2017 | Abali et al. | |

OTHER PUBLICATIONS

IBM, "External storage systems", https://www.ibm.com/support/knowledgecenter/en/STPVGU_8.1.2/com.ibm.storage.svc.console.812.doc/svc_diskcontrollerovr_208hdd.html, 2 pages, accessed on Sep. 27, 2018.
Vmware Inc., "Performance Study of VMware vStorage Thin Provisioning", VMware vSphere 4.0, Revision: Nov. 30, 2009, pp. 1-14, https://www.vmware.com/pdf/vsp_4_thinprov_perf.pdf.

* cited by examiner

*Primary Examiner* — Reginald G Bragdon
*Assistant Examiner* — Thanh D Vo
(74) *Attorney, Agent, or Firm* — Dmitry Paskalov (57) ABSTRACT

This disclosure provides a method, a computing system and a computer program product for managing storage capacity usage in a storage system. For each of a plurality of logical storage arrays in the storage system, a Remaining Time Buffer (RTB) measure indicating time to use up respective free space currently available to the logical storage array is calculated. Respective free space currently available to each of one or more of the plurality of logical storage arrays is adjusted, so that the RTB measures of the one or more logical storage arrays satisfy a threshold.

14 Claims, 7 Drawing Sheets

STORAGE CAPACITY USAGE MANAGEMENT

BACKGROUND

The present disclosure relates to storage management, and more specifically, to storage capacity usage management method and system for a storage system of a plurality of logical storage arrays with a shared storage controller.

Generally, a storage system may comprise a plurality of logical storage arrays arranged in the same pool or across different pools and backed by arrays of physical or tangible storage devices. A storage controller bridges the logical storage arrays with the physical storage devices by performing address transformation and capacity management. Server applications write/read data to/from the logical storage arrays. In the underlying layer, the write/read operations are re-directed to specific addresses in the tangible storage devices by the storage controller.

A storage controller may be shared by two or more logical storage arrays by providing a shared physical capacity in the backend storage devices to the two or more logical storage arrays. In some cases, logical storage arrays may have large logical capacities claimed from the storage controller, but the storage controller actually reserves or allocates small physical capacities on the physical storage devices for the logical arrays to improve storage capacity utilization efficiency. Thin provisioning (TP) is one of such storage mechanisms. Thin provisioning, also referred to as over-allocation or over-subscription, is a virtualized storage mechanism for automatically optimizing storage capacity utilization efficiency. Thin provisioning allows flexible, dynamic and sequential allocation of storage space to server applications on a just-enough, just-in-time and on-demand basis.

SUMMARY

Disclosed herein are embodiments of a method, computing system and computer program product for managing storage capacity usage in a storage system.

According to one embodiment of the present disclosure, there is provided a method for managing storage capacity usage in a storage system. For each of a plurality of logical storage arrays in the storage system, a Remaining Time Buffer (RTB) measure indicating time to use up respective free space currently available to the logical storage array is calculated. Respective free space currently available to each of one or more of the plurality of logical storage arrays is adjusted, so that the RTB measures of the one or more logical storage arrays satisfy a threshold.

According to another embodiment of the present disclosure, there is provided a computing system. The computing system comprises a processor and a computer-readable memory unit coupled to the processor, the memory unit comprising instructions, when executed by the processor, for implementing the method as provided according to embodiments of the present disclosure.

According to another embodiment of the present disclosure, there is provided a computer program product. The computer program product comprises a computer readable storage medium having program instructions embodied therewith, the program instructions executable by a processor to cause the processor to implement the method as provided according to embodiments of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Figure 1:
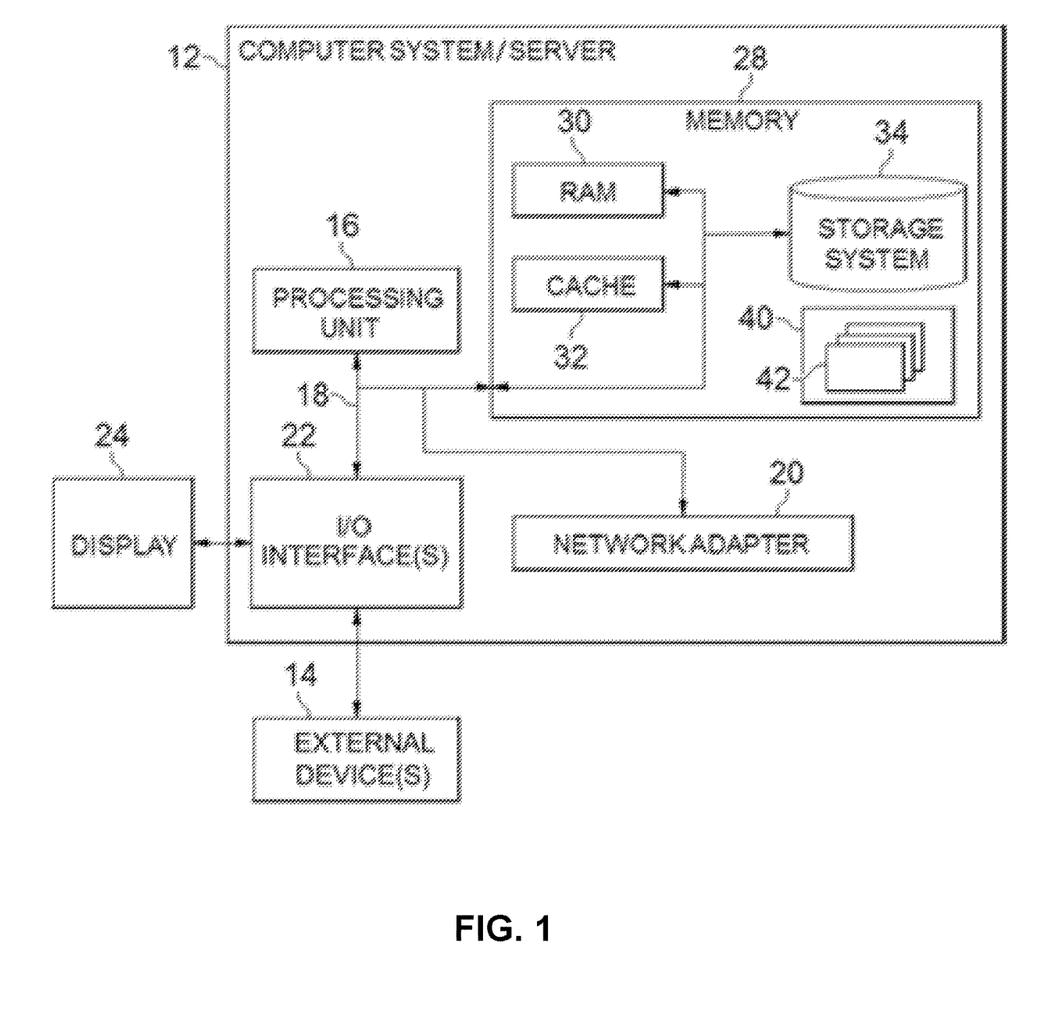
FIG. 1 shows an exemplary computer system which is applicable to implement the embodiments of the present disclosure.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As mentioned above, mechanisms such as thin provisioning (TP) that allow claimed logical capacity larger than physical capacity have advantages. Specifically, a server application can claim larger storage capacity from a thin provisioning storage device than that has been physically reserved or allocated on the storage device itself for the server application. Physical storage capacity on the storage device is only dedicated when data is actually written by the application (physical storage capacity is actually used), not when the storage capacity is initially claimed. When the application has used up a proportion of its claimed capacity, the storage system automatically enlarges the physical capacity for the application. In contrast to traditional allocation methods called "fat" or "thick" provisioning, where large storage capacity is physically allocated and dedicated to an application up front but remains unused, resulting in poor utilization rates, thin provisioning provides extremely high utilization efficiency by preventing allocation of storage capacity to unwritten data area.

However, issues such as out-of-space situation or unbalanced space usage easily arise with a storage system comprising a plurality of logical storage arrays with one or more shared storage controllers, especially when the logical storage arrays adopt the thin provisioning mechanism. A shared storage controller can offer different parts of its whole capacity to different TP logical storage arrays, so that each of the TP logical storage arrays can make use of the storage controller. The TP logical storage arrays can be in a competitive relationship with each other in obtaining more free space from the storage controller. As the logical storage arrays are unaware of their physical capacity consumption, they may easily run out of the physical space provided by the storage controller. Moreover, there may be unbalanced space usage among the logical storage arrays sharing the same controller when one logical storage array is allocated with small physical capacity but has intensive read/write operations (i.e., heavy workload) thereto while another logical storage array with infrequent read/write operations (i.e., light workload) has large physical space reserved by the controller.

The situation gets worse when TP logical storage arrays that share the same storage controller are distributed across different storage pools adopting data reduction (DR) technology. For a virtualized storage system, storage pool is used as the basic concept for a set of virtualized volumes backed up by a plurality of physical storage devices. To provide higher utilization of physical resource of the storage devices, data reduction technology is introduced. Data compression, data deduplication and thin provisioning are some implementing methods of data reduction techniques. Data reduction uses log structured file (LSF) system as the basis technology to improve write performance and thereby the overall I/O performance, as read operations can be almost always satisfied from increasing size of memory cache and the I/O operations are becoming write-heavy. A log structured file system treats its storage as a circular log and always writes changes of data sequentially to the head of the log versus conventional file system where changes of data are written in-place. To avoid the storage from being full, the log structured file system utilizes garbage collector to reclaim the old overwritten data blocks. However, garbage collector may not operate quickly enough. As write operations from different pools keep consuming free space of the shared controller, the physical space of that controller would be consumed up eventually, without informing the pools. In such a case, when a TP logical storage array in any pool needs to increase its physical space, the attempt on the shared controller shall fail and the pool would be down since it is unable to conduct any write operation to that controller due to no physical space. In fact, all other pools sharing the same controller would also go down for the same reason.

Currently, there are systems allowing user to enable array-side thin provisioning. But the systems need the users to manually monitor and manage the physical capacity. Automatic mechanism to prevent the physical space of controllers that are shared by multiple logical storage arrays from being consumed unbalanced or to protect the controller from an out-of-space situation is still needed.

Figure 2:
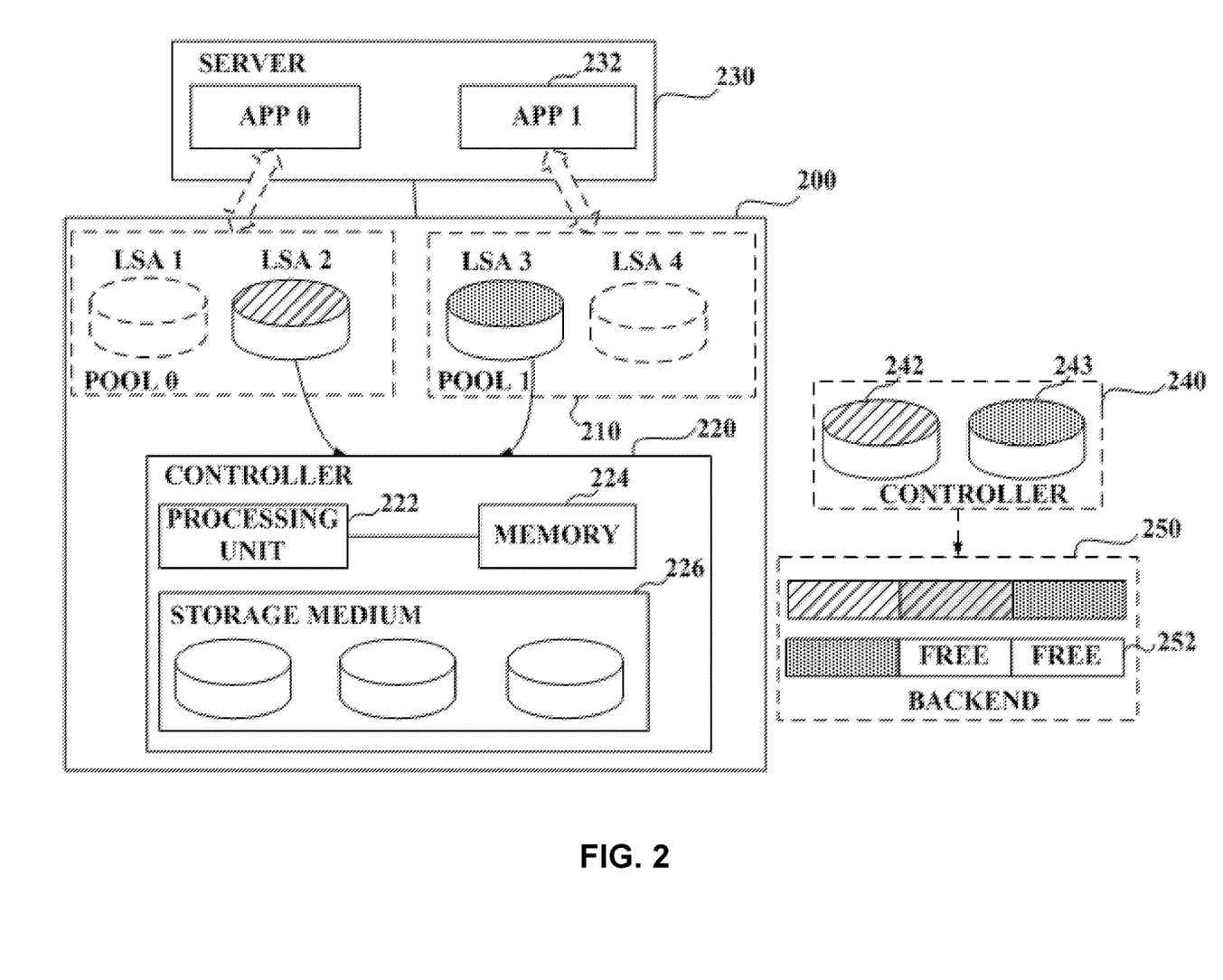
FIG. 2 is a schematic diagram illustrating a storage system 200 according to an embodiment of the present disclosure.

With reference now to FIG. 2, FIG. 2 is a schematic diagram illustrating a storage system 200 according to an embodiment of the present disclosure. The storage system 200 comprises a plurality of logical storage arrays (LSAs). At least two LSAs may share a same storage controller. As a non-limiting example, FIG. 2 shows four LSAs with LSA 2 and LSA 3 sharing the same controller 220. LSAs may be any logical storage arrays that have claimed capacities larger than or equal to their physical capacities. In the example as shown in FIG. 2, LSA 2 and LSA 3 are TP LSAs that have claimed capacities larger than their physical capacities available from the controller 220; while LSA 1 and LSA 4 are internal LSAs whose claimed capacities are equal to their physical capacities. In other embodiments, the plurality of LSAs may have other configurations. LSAs are distributed in a same storage pool or across different storage pools. In the example as shown in FIG. 2, LSA 1 and LSA 2 belong to Pool 0 and LSA 3 and LSA 4 belong to Pool 1. Accordingly, the controller 220 is shared across different pools (Pool 0 and Pool 1 are collectively referred to as pool(s) or storage pool(s) 210). Storage pools 210 provide virtual storage space for respective server applications 232 on a server 230 and function as an interface between the server 230 and the controller 220. One or more storage pools 210 may adopt data reduction (DR) mechanism by using a log structured file system.

The storage system 200 further comprises storage controller 220. The storage controller 220 includes a processing unit 222 in communication with memory 224 and is embodied with a storage medium 226. The processing unit 222 may be configured to execute instructions stored on the memory 224 to perform various kinds of management functionalities on storage space of the storage medium 226. In one embodiment, the storage medium 226 includes multiple arrays of storage devices such as various forms of Redundant Array of Independent Disks (RAID) formed from any kind of non-volatile storage devices, comprising but not limited to hard drive disk (HDD), solid state disk (SSD) or a flash memory. The storage controller 220 may be in local or remote communication with one or more servers 230. As a non-limiting example, a server 230 with two applications (APP 0 and APP 1) running is illustrated. Applications 232, also referred to as user or client applications, read or write data from or to storage pools 210 (e.g. Pool 0 for APP 0 and Pool 1 for APP 1). The read or write operations to LSA 2 and 3 are re-directed to physical space provided by the storage medium 226 by the controller 220.

Block 240 shows virtual volumes 242 and 243 of the controller 220 which are respectively corresponding to LSA 2 and LSA 3. Block 250 shows the space usage status of the backend storage medium of the controller. Physical space provided by the storage medium 226 is divided into a set of extents 252. An extent, as a unit for space allocation, is a string of sequential physical addresses. In the example of FIG. 2, the backend of controller contains 6 extents of which two have been allocated to LSA 2, two have been allocated to LAS 3 and the remaining two are free. With thin provisioning configuration, the two free extents may be allocated to any of LSA 2 and LSA 3 on demand.

Figure 3:
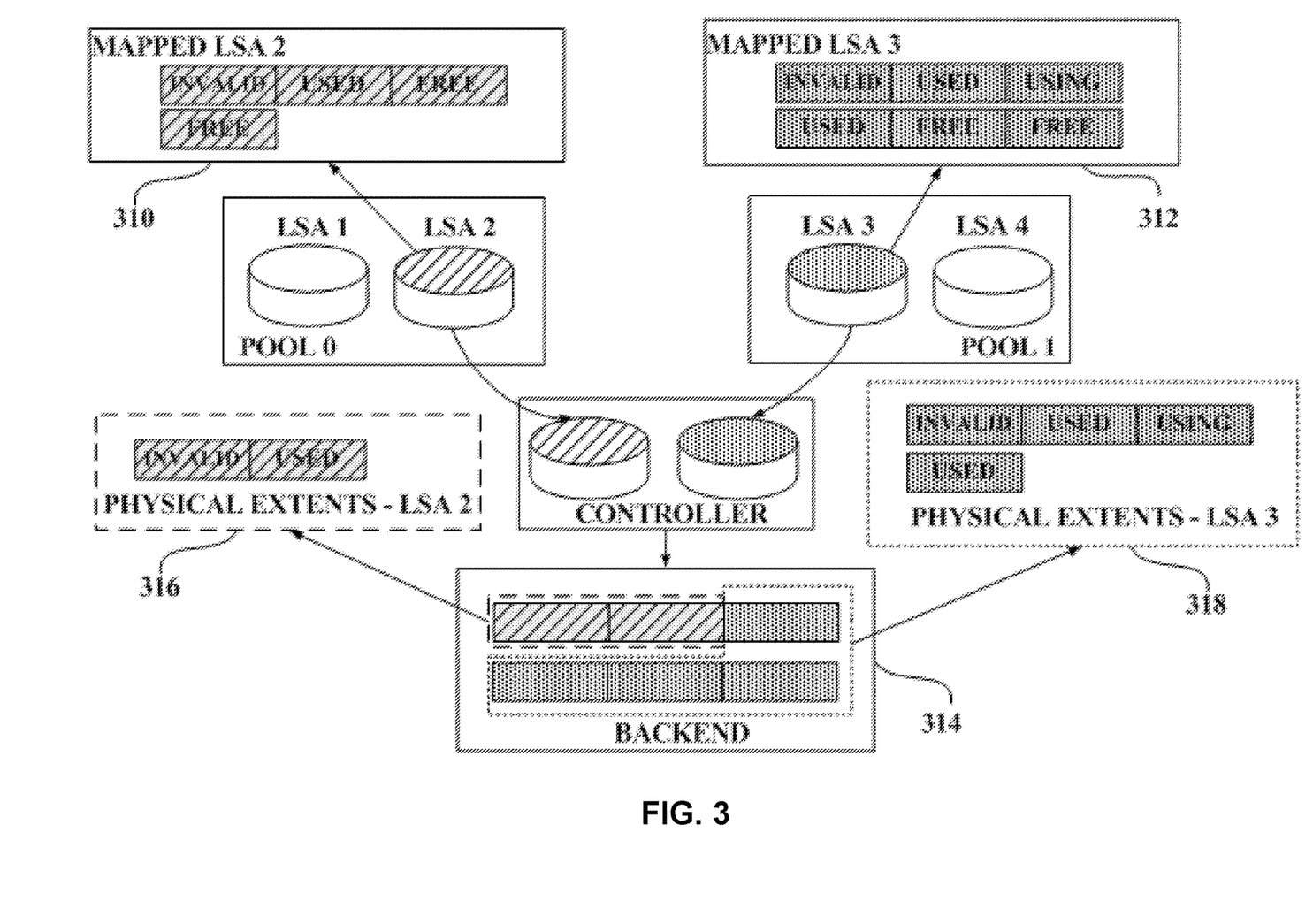
FIG. 3 is a schematic diagram illustrating the capacity usage status of mapped arrays and physical extents for LSAs of FIG. 2.

FIG. 3 is a schematic diagram illustrating the capacity usage status of mapped arrays and physical extents for LSAs of FIG. 2. Blocks 310 and 312 shows the usage status of mapped arrays for LSA 2 and LSA 3. As an example, LSA 2 and LSA 3 may respectively claim a virtual capacity of four and six extents from the shared controller. LSA 2 has written data to two of the six extents, leaving two free extents, while LSA 3 has written data to four of the six extents, leaving two free extents. For those extents have been written, there are three different data written status: (1) 'invalid' represents an old extent in which all data gets overwritten; (2) 'used' represents an extent that has been fully written with data; and (3) 'using' represents an extent that has been partially written with data. Regardless of the data written status of the extents, the backend of controller only cares about whether a specific extent has been allocated or is free. As shown in block 314, the backend of the controller has a total physical size of six extents, of which two have been allocated to LSA 2 (shown in block 316, corresponding to the two extents that have been written in block 310) and four have been allocated to LSA 3 (shown in block 318, corresponding to the four extents that have been written in block 312). In such a case, Pool 0 and Pool 1 have consumed up all the physical capacity of the controller but are unaware of this. When any of the pools attempts to write more data to LSA 2 or LSA 3, and if the garbage collection cannot recycle the invalid extents quickly, it will go down for an out-of-space condition.

Another issue shown in FIG. 3 with the storage system is unbalanced space usage. When creating the mapped array 3, Pool 1 claimed much more space than Pool 0 for the mapped array 2, expecting there would be more data to keep. In this case, the controller would provide plenty of physical space for Pool 1. However, Pool 0 may be in heavy write workload, and Pool 1 may be on the contrary. For example, the controller would be continually increasing the array size for Pool 0 which is a DR pool, due to its fast growth in space. But since Pool 1 has occupied too much space, when reaching the max physical capacity, Pool 0 would fail to do further write if the garbage collection is not quick enough, while Pool 1 still has plenty of space not utilized. This cannot be resolved by traditional pool-based technology since it needs an overall picture of the controller status and different workloads of all the pools.

To solve the issues of out-of-space situation and unbalanced space usage as described above for a storage system of a plurality of LSAs with a shared controller, it is necessary to predict the capacity usage for the LSAs and for the controller. Described below with reference to FIG. 4, embodiments of the present disclosure introduce a measure, the remaining time buffer (RTB), to describe the estimated time that each LSA and the controller will use up their respective free space currently available. With such a measure, mechanisms to balance the free space of the LSAs and to detect out-of-space emergencies are possible.

Figure 4:
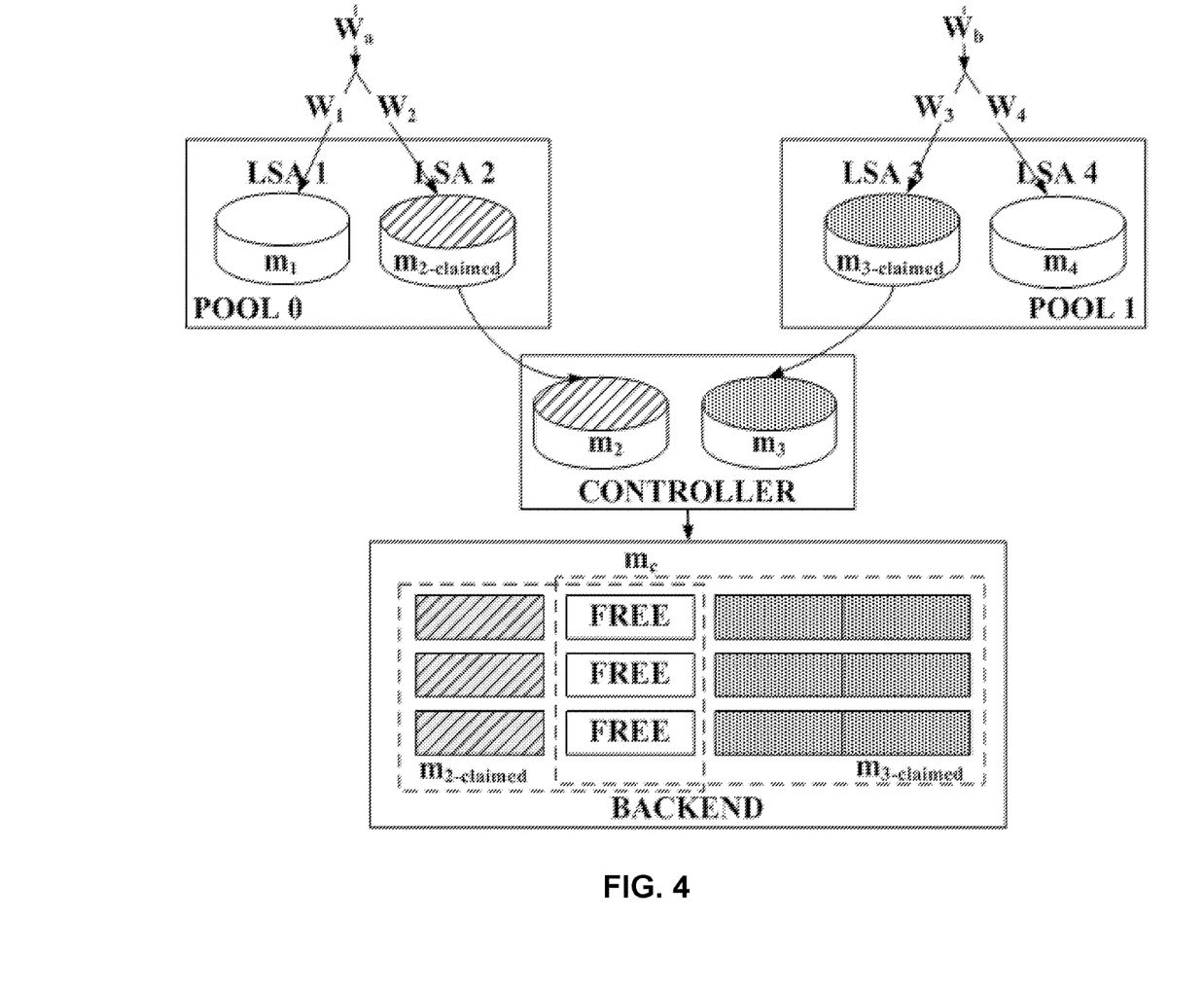
FIG. 4 is a schematic diagram illustrating the space usage versus space consuming speed for each entity in the storage system as shown in FIG. 2.

FIG. 4 is a schematic diagram illustrating the space usage versus space consuming speed for each entity (i.e. the LSA or the controller) in the storage system as shown in FIG. 2. $W_i$ (i=1~4) represents space consuming speed for each LSA (i.e. LSA 1 to 4) and $W_j$ (j=a or b) for each pool (i.e. Pool 0 to 1). Space consuming speed for an entity indicates how much free space the entity consumes or needs per unit time. Space consuming speed may be collected as a statistical average over a relatively long time period or may be acquired instantaneously as server applications perform I/O operations with the storage system. For LSAs arranged in DR pools which adopt log-structured file system, write operations dominate the I/O workloads of the pools (and thus of the LSAs) and are always directed to locations in the physical free space sequentially. The space consuming speed for an entity is a consequence of both the I/O workload and garbage collection for that entity. Accordingly, the space consuming speeds for DR pools may be collected by observing the workloads and garbage collection speeds of the pools, which may be quite easy to carry out. For pools other than data reduction pools, since write operations mostly occur in-place, the space consumption speeds for such pools can be more difficult to be collected as compared to DR pools, but are still possible to be collected using various methods already known to those skilled in the art. Space consuming speeds for Pool 0 and Pool 1 are divided onto space consuming speeds of the LSAs in respective pools. In the example as shown in FIG. 4, it is satisfied that $w_a = W_1 + W_2$ and $W_b = W_3 + W_4$. Besides, $W_c$ which represents space consuming speed for the controller shared by LSA 2 and LAS 3 is a sum of the space consuming speeds of LSA 2 and LSA 3, i.e. $W_c = W_2 + W_3$.

As shown in FIG. 4, let $m_1$ and $m_4$ represent the total storage capacities respectively for internal LSA 1 and LSA 4, $m_{2\text{-}claimed}$ and $m_{3\text{-}claimed}$ represent the storage capacities claimed respectively by TP LSA 2 and LSA 3 from the shared controller, and $m_2$ and $m_3$ represent physical storage capacity actually reserved by the controller for TP LSA 2 and LSA 3. Since $m_{2\text{-}claimed}$ and $m_{3\text{-}claimed}$ are the claimed capacities, they would not be changed unless the server applications expand or shrink explicitly and they are the maximum that $m_2$ and $m_3$ can reach respectively. On the other hand, $m_2$ and $m_3$ are the underlying physical capacities, which get increased upon reaching each proportion point of the claimed capacities. By unmapping the extents (e.g. by garbage-collecting those recently over-written extents) in the backend of the controller, $m_2$ and $m_3$ can be decreased too. It can be understood that $m_{2\text{-}claimed} \geq m_2$ and $m_{3\text{-}claimed} \geq m_3$. Normally, a sum of the claimed capacities from a shared controller should be greater than the physical capacity of the controller; otherwise, it is not a practical and reasonable scenario using a shared controller for TP LSAs. Thus $m_{2\text{-}claimed} + m_{3\text{-}claimed} \geq m_c$, where $m_c$ represents physical storage capacity of the shared controller. Furthermore, as the physical storage capacity provided by a controller is limited, a sum of the physical storage capacities actually reserved for TP LSAs associated with the controller should be no greater than the physical storage capacity of the controller, i.e., $m_2 + m_3 \leq m_c$.

As write operations to DR Pool 0 and Pool 1 would be sequentially striped between their LSAs in proportion to the storage capacities of the LSAs, the following condition is satisfied.

$$W_1/W_2 = m_1/m_{2\text{-}claimed} \text{ and } W_3/W_4 = m_{3\text{-}claimed}/m_4.$$

Let $R_i$ (i=1 or 2 or c) represents the relative rate of space consumption for Pool 0 or Pool 1 or the controller. $R_i$ may be determined as follows, $$R_0 = W_1/m_1 = W_2/m_{2\text{-}claimed} = W_a/(m_1 + m_{2\text{-}claimed}) \text{ and}$$

$$R_1 = W_3/m_{3\text{-}claimed} = W_4/m_4 = W_b/(m_{3\text{-}claimed} + m_4) \text{ and}$$

$$R_c = (W_2 + W_3)/m_c = \frac{((W_a * m_{2\text{-}claimed})/(m_1 + m_{2\text{-}claimed}) + (W_b * m_{3\text{-}claimed})/(m_{3\text{-}claimed} + m_4))}{m_c}$$

For example, $R_i$ may be in the unit of x %/hour. For short term and long term concerns, raw value and statistical average value may be respectively used to describe each of them. Raw value of $R_i$ may be collected on a cycle basis, where the cycle may be a fixed time interval for I/O operations directed to the storage system; while statistical average value of $R_i$ may be determined by observing the raw values for a predetermined time period and calculating a moving average value (e.g. Exponential Moving Average) based on the raw values.

To compare the space consuming status among the controller and the LSAs, a measure referred to as "Remaining Time Buffer (RTB)" is introduced to indicate time to use up free space currently available to the controller or to each LSA. For each involved entity, either the controller or the LSA, the RTB measure may be determined as a ratio of the respective free space currently available to the entity and the respective space consuming speed of the entity. For a TP LSA, the free space currently available includes space from the total capacity claimed from a controller that has not been used yet. For an internal LSA, the free space currently available includes space from the total physical capacity that is not actually used yet. For a controller, the free space currently available includes space from the total physical capacity provided by the backend storage that has not been allocated to any associated LSAs yet. Depending on the way in which the space consuming speed of the entity is collected, the RTB measure may be determined as a moving average in a time period (e.g. a relatively long time period) for long term concern or on a cycle basis for a short term concern. The RTB measure may also be determined as a ratio of a percentage of respective free space over the overall capacity and the respective relative rate of space consumption. In the example as shown in FIG. 4, let $RTB_i$ (i=1~4 or c) represents the RTB measure for LSA 1~4 or for the controller.

For internal LSA 1 and 4, $$RTB_1 = \frac{m_{1\text{-}free}}{W_1} = \frac{m_{1\text{-}free}/m_1}{R_0}$$

$$RTB_4 = \frac{m_{4\text{-}free}}{W_4} = \frac{m_{4\text{-}free}/m_4}{R_1}$$

For TP LSA 2 and 3, $$RTB_2 = \frac{m_{2\text{-}free}}{W_2} = \frac{m_{2\text{-}free}/m_{2\text{-}claimed}}{R_0}$$

$$RTB_3 = \frac{m_{3\text{-}free}}{W_3} = \frac{m_{3\text{-}free}/m_{3\text{-}claimed}}{R_1}$$

For the controller, $$RTB_c = \frac{m_{c\text{-}free}}{W_c} = \frac{m_{c\text{-}free}/m_c}{R_c}$$

where $m_{i\text{-}free}$ (i=1~4 or c) represents the free space of LSA 1~4 or the controller. In the example as shown in FIG. 4, LSA 2 has a claimed capacity of 6 extents ($m_{2\text{-}claimed}=6$) and has used 3 extents ($m_2=3$), leaving $m_{2\text{-}free}$ equal to 3 extents ($m_{2\text{-}free}=m_{2\text{-}claimed}-m_2$); LSA 3 has a claimed capacity of 9 extents ($m_{3\text{-}claimed}=9$) and has used 6 extents ($m_3=6$), leaving $m_{3\text{-}free}$ equal to 3 extents ($m_{3\text{-}free}=m_{3\text{-}claimed}-m_3$); the controller has a total physical capacity of 12 extents ($m_c=12$) and has allocated 9 extents to LSA 2 and LSA 3 ($m_2+m_3=9$), leaving $m_{c\text{-}free}$ equal to 3 extents ($m_{c\text{-}free}=m_c-(m_2+m_3)$).

Figure 5:
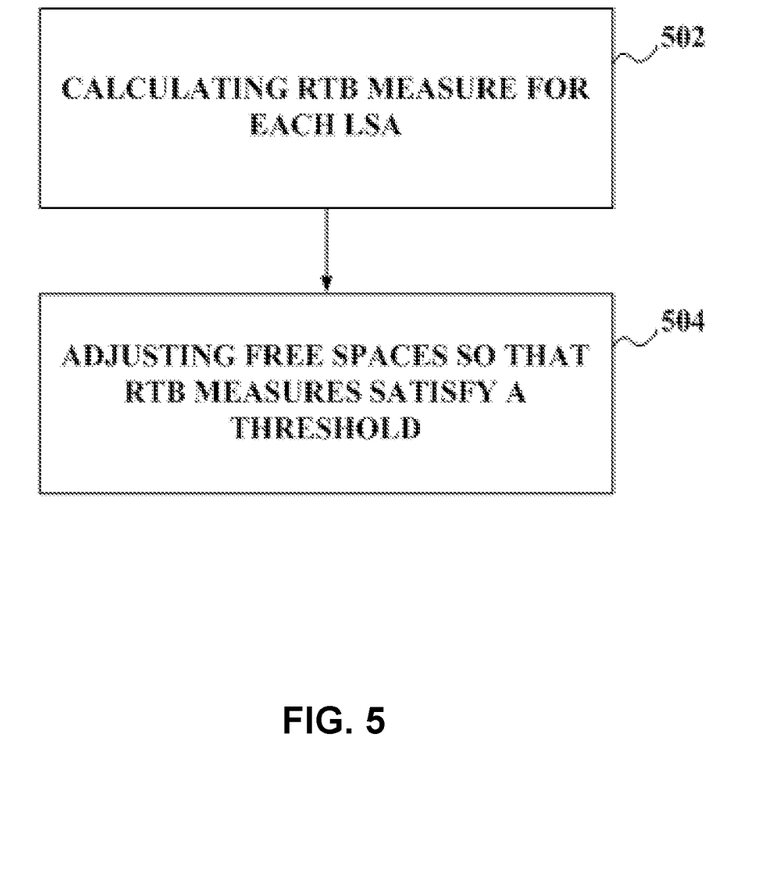
FIG. 5 illustrates a flow chart of a method for managing storage capacity usage in a storage system according to an embodiment of the disclosure.

Based on the RTB measures, methods for managing storage capacity usage, in particular for addressing the issues of unbalanced space usage and out-of-space emergency, in a storage system with a plurality of LSAs and a shared controller can be implemented. FIG. 5 illustrates a flow chart of a method for managing storage capacity usage in a storage system according to an embodiment of the disclosure.

At step 502, a Remaining Time Buffer (RTB) measure indicating time to use up respective free space currently available to each LSA in a storage system is calculated. The storage system may comprise a plurality of LSAs. In some embodiments, at least two of the LSAs may share the same controller. As described above, the shared controller is responsible for providing and managing shared physical storage capacity from its backend storage devices to the at least two LSAs. A RTB measure indicating time to use up respective free space currently available to the controller may be calculated for the controller. For the whole storage system, there may be more than one shared controllers. In that case, a RTB measure may be calculated for each of the controllers. The at least two LSAs that share the controller(s) may be thin provisioning LSAs. Furthermore, the at least two LSAs that share the controller(s) may be distributed in the same storage pool, or across different storage pools. In some examples, the storage pools may be data reduction pools adopting log-structured file systems.

The RTB measure for each entity (i.e. the LSA or the controller) may be determined in a way as described above with a reference to FIG. 4. In some embodiments, for balancing the space usage among the LSAs for a long term concern, the RTB measure for each LSA is may be average ratio of the respective free space currently available and a respective space consuming speed in a time period. Similarly, the RTB measure for a shared controller may be an average ratio of the respective free space currently available to the controller and the respective space consuming speed for the controller in the time period. The time period may be relatively long as compared to each I/O operation cycle. For example, the I/O operation cycle may be one to five minutes, while the time period for calculating the RTB measure may be several hours. In other words, the system may monitor the instantaneous RTB measures for hundreds of cycles and then calculate a moving average based on the instantaneous RTB measures. In other embodiments, for detection of out-of-space emergency in a short term concern, the RTB measure for each LSA may be an instantaneous ratio of the respective free space currently available and a respective space consuming speed on a cycle basis. Similarly, the RTB measure for a shared controller may be an average ratio of the respective free space currently available to the controller and the respective space consuming speed for the controller on the cycle basis. The cycle may refer to each I/O operation cycle as described above.

At step 504, respective free space currently available to each of one or more of the LSAs are adjusted so that the RTB measures of the one or more LSAs satisfy a threshold. In some embodiments, for balancing the space usage among the LSAs for a long term concern, the threshold is a weighted RTB measure average based on the RTB measures and the space consuming speeds of the controller and of the plurality of LSAs. The weighted RTB measure average reflects a desired balanced time to use up free space currently available to each entity involved in the storage system. If the RTB measures for all relating entities (including each LSA and the controller(s)) are made approximate to the weighted RTB measure average, it can be ensured that no LSA is using up its currently available free space too fast or too slowly. Thus, all the LSAs can run out of their respective free space currently available at a substantially aligned time, thereby improving the space efficiency of the whole storage system. Specifically, the weighted RTB measure average $RTB_{avg}$ may be calculated as, $$RTB_{avg} = \frac{\sum RTB_i * W_i}{\sum W_i}$$

where i indicates each LSA if all of the LSAs sharing the same controller have their RTB measures less than the RTB measure of the shared controller, or i indicates the shared controller(s) and each of the non-controller-sharing LSAs if any of the LSAs sharing the same controller has its RTB measure greater than or equal to the RTB measure of the shared controller.

For example, for the storage system as shown in FIG. 4, if it is determined that both $RTB_2$ and $RTB_3$ are less than $RTB_C$, which means that the shared controller will not use up its physical free space currently available before any of LSA 2 and LSA 3, then the weighted RTB measure average is calculated based on the RTB measures and space consuming speeds of LSA 1~4 as follows.

$$RTB_{avg} = \frac{\sum_{i=1}^{4} RTB_i * W_i}{\sum_{i=1}^{4} W_i}$$

If it is determined that any of $RTB_2$ and $RTB_3$ is greater than or equal to $RTB_C$, it means that the shared controller will use up its physical free space currently available before LSA 2 or LSA 3. In other words, there is definitely an overlapped or competitive field of free space for LSA 2 and LSA 3. In such a case, the weighted RTB measure average is calculated based on the RTB measures and space consuming speeds of LSA 1 and 4 which are non-controller-sharing and of the controller as follows.

$$RTB_{avg} = \frac{RTB_1 * W_1 + RTB_c * W_c + RTB_4 * W_4}{W_1 + W_c + W_4}$$

In other embodiments, for detection of out-of-space emergency in a short term concern, the threshold is a predetermined value. The predetermined value may be a value uniform to all the LSAs. In a tiered storage system where different types of data are stored on storage devices of appropriate levels of performance and cost, for LSAs provided by storage devices in the same tier, the predetermined values may be the same. In other cases, the predetermined value may be a plurality of individual values for different LSAs. For example, it may be known in advance that some LSAs may take longer time to be restored or expanded after a failure of out-of-space than other LSAs. Then these LSAs may correspond to thresholds smaller than those of the other LSAs so that there can be enough time for them to be fixed after failure. In some embodiments, the threshold, either uniform or non-uniform to the LSAs may vary over time.

In some embodiment, for a storage system comprises internal LSAs (e.g. LSA 1 and 4 as shown in FIG. 4) that do not share any common controller, before adjustment of any free space, the storage system may first compare the RTB measure of the shared controller with the RTB measures of the internal LSAs. If the RTB measure of the shared controller is greater than or equal to all the RTB measures of the internal LSAs, then there would be a time that one of the internal LSA uses up its physical free space and leads to the attached storage pool going down, while the rest of the storage pools (including the LSAs) and the shared controller still have free space and go on working. In such a case, it is not necessary to adjust the free spaces currently available to any LSA since the failure of one pool would not lead to other pools (and the associated LSAs) and the shared controller in unavailable. Otherwise, if the RTB measure of the shared controller is less than the RTB measure of any internal LSA, this can lead to a situation that when the competitive free space is used up, all the pools (with the associated LSAs) will be down due to no free physical space although there may still be much free space in the internal LSAs. In such a case, adjustment of free spaces currently available to one or more LSAs can be more advantageous.

In some embodiments, the one or more LSAs to each of which the respective free space currently available is adjusted may be the LSAs sharing the same controller(s) whose RTB measure(s) does not satisfy the threshold. Accordingly, making the RTB measures of the one or more LSAs satisfy a threshold further comprises making both the RTB measures of the LSAs sharing the same controller(s) and the RTB measure of the controller(s) satisfy the threshold. For example, in the examples as shown in FIG. 4, it is possible that one or both of $RTB_2$ and $RTB_3$ satisfy the threshold, while $RTB_c$ does not satisfy the threshold. This happens when LSA 2 or LSA 3 claims large capacity from the controller, while the actual free physical extents currently available in the backend of the controller will soon be used up under the space consuming speeds of LSA 2 and LSA 3. In such a case, although RTB measures for LSA 2 and LSA 3 might already satisfy the threshold, the free spaces currently available to LSA 2 and LSA 3 are still adjusted to make sure that RTB measures for LSA 2, LSA 3 and controller will all satisfy the threshold eventually.

In some embodiments, to make the RTB measures of one or more LSAs satisfy a threshold comprises making the RTB measures of the one or more LSAs greater than or equal to the threshold. In some embodiments, the one or more LSAs to each of which the respective free space currently available is adjusted may be the LSAs that have RTB measures less than the threshold. In other embodiments, the one or more LSAs to each of which the respective free space is adjusted may be the LSAs each having its free space currently available less than a respective free space boundary. The free space boundary for a LSA can be determined by a multiplication of the threshold with the respective space consuming speed of the LSA.

The adjustment of the respective free space currently available to each of the one or more LSAs may be performed automatically or manually. The adjustment may comprise scaling up the backend storage devices for some LSAs so that larger physical capacities can be provided. In addition or alternatively, the adjustment may comprise migrating data from some LSAs to other LSAs. For data migration, a destination LSA will not use up free space currently available to the destination LSA before a source LSA will do, even if at least part of the free space is reserved for the data migration. In some embodiments, a destination LSA has a RTB measure satisfies the threshold after reserving at least part of free space currently available to the destination LSA for the data migration. Preferably, the RTB measure of the destination LSA is greater than or equal to the threshold after reserving at least part of the free space.

Similar to the mechanism of tiered storage system, a tiered data migration can be provided. Various types of extent to be migrated from the source LSA are differentiated. The types of extent may include but not limited to persistent extent (such as read-only or recently over-written extent), dynamic extent (such as write-intensive extent) and cold extent (such as extent that is not accessed for a long term). Next, the different types of extent are to be migrated onto destination LSAs in appropriate tiers. Generally, LSAs provided in upper tiers have faster access speed, lower capacity and higher cost. For example, Tier 0 (the uppermost tier) may consist of SSD (Solid State Drive) RAID (Redundant Array of Independent Disks) arrays, consist of 3D-Xpoint RAID arrays, consist of phase-change memory (PCM) RAID arrays, or consist of other flash drive RAID arrays, Tier 1 (the intermediate tier) may consist of Enterprise DDM (Disk Drive Module) RAID arrays, and Tier 2 (the lowermost tier) may consist of Nearline DDM RAID arrays. In some embodiments, persistent extent is migrated onto a destination LSA in the same tier with the source LSA. In some embodiments, dynamic extent or cold extent is migrated onto a destination LSA in a different tier from the source LSA. For example, dynamic extent may be migrated onto upper tier LSA and cold extent may be migrated onto lower tier LSA. As such, a higher efficiency in both the space utilization and the cost will be achieved.

Figure 6:
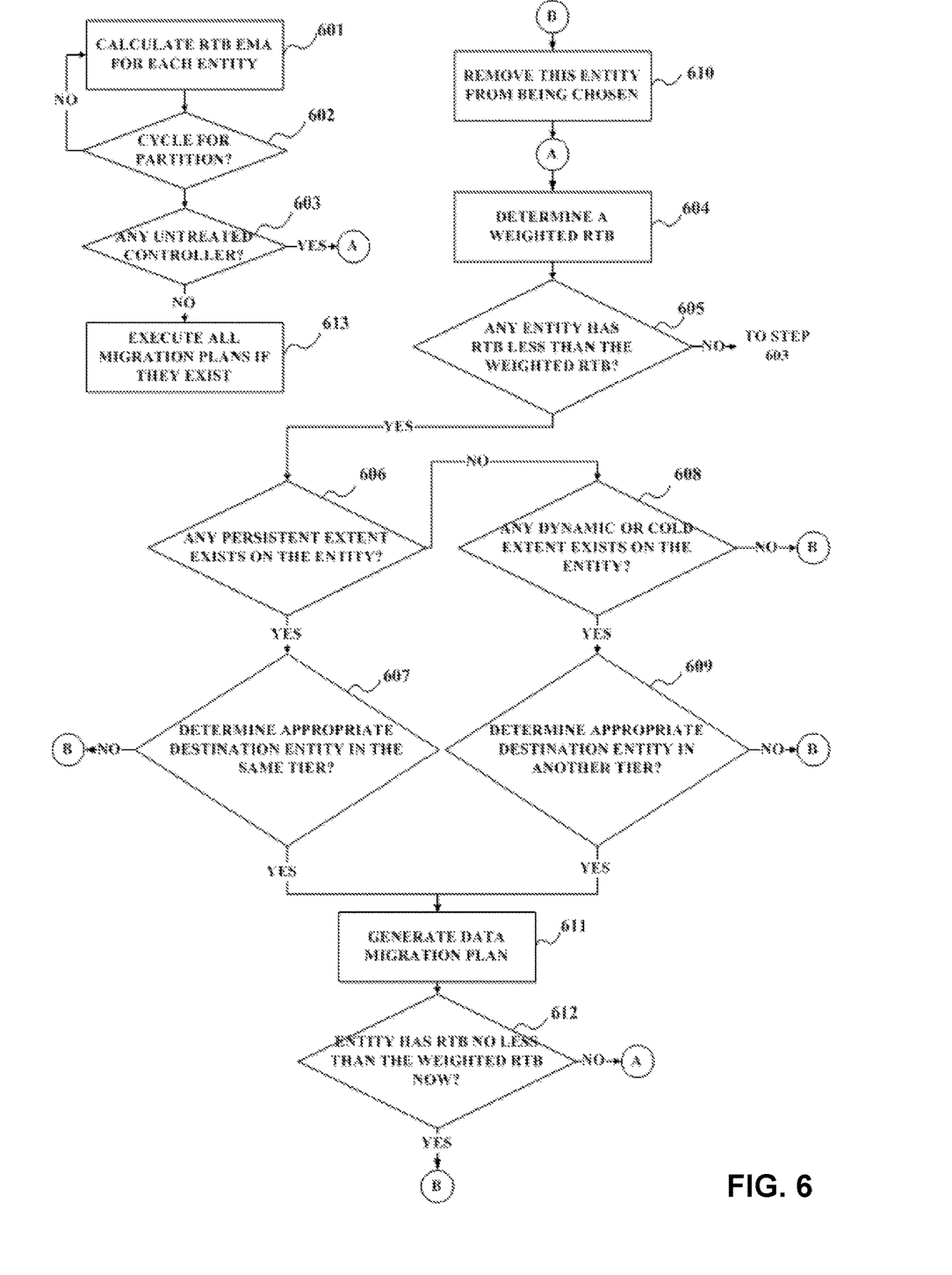
FIG. 6 illustrates an exemplary process for managing storage capacity usage for a storage system to achieve balanced free space among all the entities involved in accordance with an embodiment of the present disclosure.

With reference to FIG. 6, an exemplary process is illustrated that may manage storage capacity usage for a storage system to achieve balanced free space among all the entities involved in accordance with an embodiment of the present disclosure. The process may be executed on the computer system as shown in FIG. 1 as a background process. In one or more embodiments, the process is initiated periodically in block 601 where a RTB EMA is calculated for each entity. The entities may comprise a plurality of LSAs and one or more controllers each shared by at least two of the LSAs. As described above with reference to FIG. 4, the RTB EMA may be calculated by observing the RTB measures in a plurality of I/O operation cycles and calculating an exponential moving average of the RTB measures. Next, in block 602, the system determines whether the current cycle is a partition cycle. The partition cycle refers to a time period when appropriate data migration plans are made and executed. The process will loop until the current cycle is the partition cycle to transfer to block 603. In block 603, the system determines if every shared controller has been traversed. In response to a determination that all the shared controllers have been traversed, the process transfer to block 613 where any existing migration plans will be executed. Otherwise, the process will transfer to blocks 604-612.

In block 604, a weighted RTB is determined based on the RTB EMAs of relating entities (e.g. including any LSA in the storage system and the shared controller(s)) calculated in block 601. The process of determining the weighted RTB has been described with reference to FIG. 4. Then, in block 605, the system determines if any relating entity has a RTB EMA less than the weighted RTB. A negative result in block 605 will lead the process to loop back to block 603, while a positive result in block 605 will lead the process to transfer to blocks 606-611 where a data migration plan may be generated. If the entity that has the RTB EMA less than weighted RTB is a LSA, source entity for the data migration plan can be that LSA. Otherwise, if the entity that has the RTB EMA less than weighted RTB is a controller, the source entity for the data migration plan can be each of the LSAs that share the controller.

As described above, in blocks 606-611 the data migration plan may be generated as a tiered data migration in which the destination entity for the data migration is determined based on the type of data extents existing on the source entity. The destination entity may be another LSA in the storage system. First, the system attempts to find if there is any persistent extent on the source entity. If the persistent extent is found, then the system attempts to determine an appropriate destination entity in the same tier with the source entity. The destination entity is referred to as being appropriate if it will have a RTB EMA greater than or equal to the weighted RTB even after accepting the persistent extent. If no persistent extent can be found on the source entity, then the system continues to find if there is any dynamic extent or cold extent on the source entity after accepting the persistent extent. If the dynamic extent or cold extent is found, then the system attempts to determine an appropriate destination entity in a different tier from the source entity. The destination entity is referred to as being appropriate if it will have a RTB EMA greater than or equal to the weighted RTB even after accepting the dynamic extent or cold extent. In any case, as long as both the extent on the source entity and the corresponding destination entity are found, the data migration plan can be generated successfully, as shown in block 611. Otherwise, the process transfers to block 610 where the current source entity is removed from being chosen and another source entity will be considered.

Subsequent to block 611, in block 612, the system determines if the source entity has a RTB EMA greater than or equal to the weighted RTB after migrating some of its extents to the destination entity. A negative result means that the source entity is still in the risk of running out of its free space soon and data migration to more destination entities is still desired. Thus, the process may loop back to block 604. A positive result means that the source entity is now in a balanced status in term of remaining time to use up its free space with other entities, and thus the process may then loop back to block 610.

Figure 7:
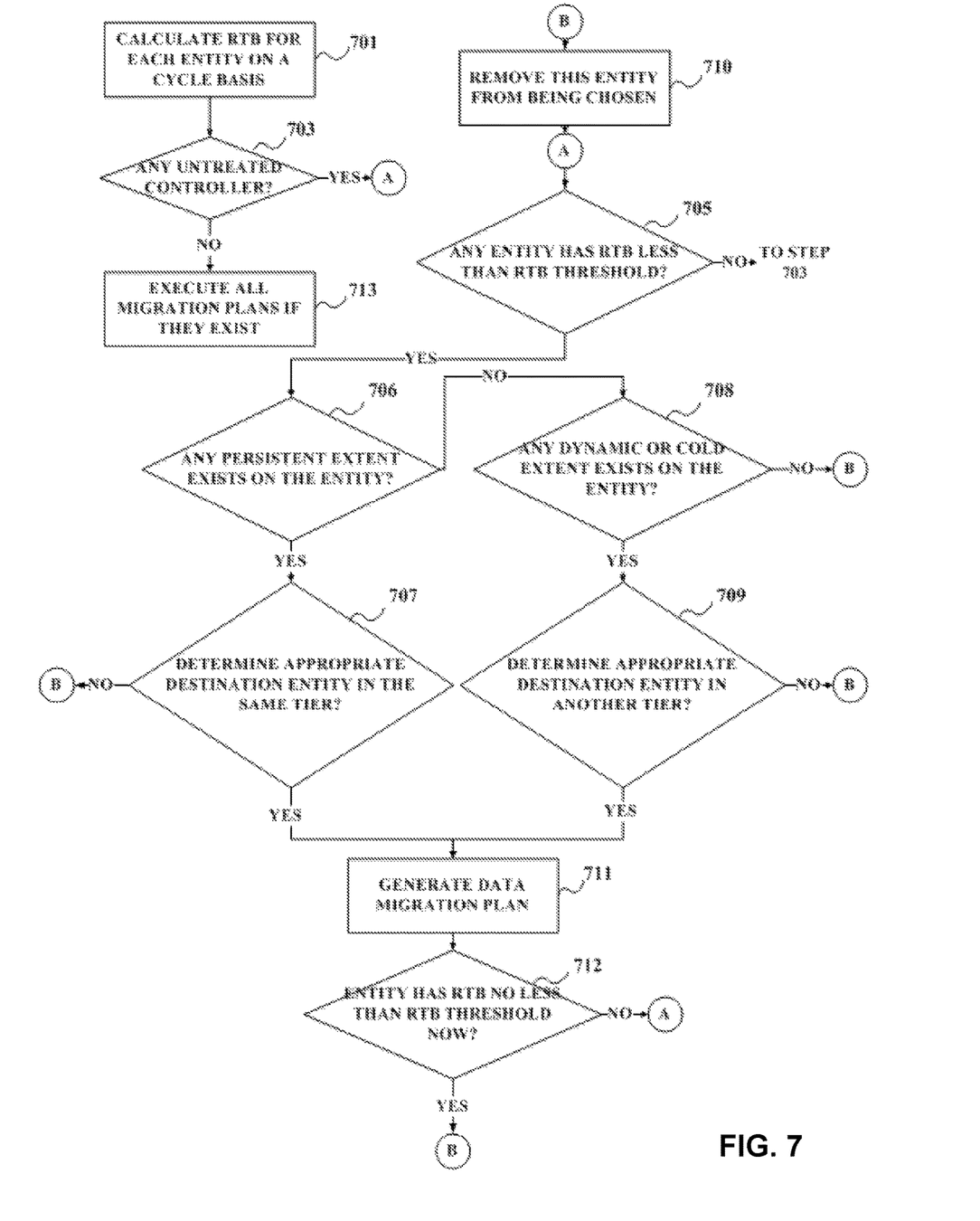
FIG. 7 illustrates an exemplary process for managing storage capacity usage for a storage system to detect and avoid out-of-space emergency in accordance with an embodiment of the present disclosure.

With reference to FIG. 7, an exemplary process is illustrated that may manage storage capacity usage for a storage system to detect and avoid out-of-space emergency in accordance with an embodiment of the present disclosure. The exemplary process is generally similar to the process illustrated in FIG. 6 with the differences lie in that (1) in block 701, a RTB value other than RTB EMA is calculated for each entity on a cycle basis; (2) since the RTB value is calculated on each cycle, there is no need to wait for the partition cycle as shown in block 602 of FIG. 6; (3) instead of determining a weighted RTB as shown in block 604 of FIG. 6, the process of FIG. 7 directly compares the RTB of each entity with a RTB threshold and in subsequent blocks 706-712 the RTB threshold is used in place of the weighted RTB as used in blocks 606-612 of FIG. 6. Various embodiments of the RTB threshold have been described with reference to FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

According to an embodiment of the present disclosure, there is provided a computing system. The computing system comprises a processor and a computer-readable memory unit coupled to the processor, the memory unit comprising instructions, when executed by the processor, for managing storage capacity usage in a storage system. The instructions for managing storage capacity usage in the storage system comprise instructions for calculating, for each of a plurality of logical storage arrays in the storage system, a Remaining Time Buffer (RTB) measure indicating time to use up respective free space currently available to the logical storage array. The instructions for managing storage capacity usage in the storage system further comprise instructions for adjusting respective free space currently available to each of one or more of the plurality of logical storage arrays so that the RTB measures of the one or more logical storage arrays satisfy a threshold.

According to an embodiment of the computing system, for each of the plurality of logical storage arrays, the RTB measure is calculated as an average ratio of the respective free space currently available and a respective space consuming speed in a time period.

According to an embodiment of the computing system, the instructions for managing storage capacity usage in the storage system further comprise instructions for calculating, for a controller shared by at least two of the plurality of logical storage arrays, a RTB measure indicating time to use up respective free space currently available to the controller. The threshold is a weighted RTB measure average based on the RTB measures and the space consuming speeds of the controller and of the plurality of logical storage arrays.

According to an embodiment of the computing system, for each of the plurality of logical storage arrays, the RTB measure is calculated as an instantaneous ratio of the respective free space currently available and a respective space consuming speed on a cycle basis.

According to an embodiment of the computing system, the threshold is a predetermined value.

According to an embodiment of the computing system, the instructions for adjusting the respective free space currently available to each of the one or more logical storage arrays further comprise instructions for: determining a destination logical storage array for receiving data migration from the one or more logical storage arrays, wherein the destination logical storage array has a RTB measure satisfies the threshold after reserving at least part of free space currently available to the destination logical storage array for the data migration.

According to an embodiment of the computing system, the destination logical storage array is from the same tier with the one or more logical storage arrays if persistent extent is to be migrated from the one or more logical storage arrays.

According to an embodiment of the computing system, the destination logical storage array is from a different tier from the one or more logical storage arrays if dynamic extent or cold extent is to be migrated from the one or more logical storage arrays.

According to an embodiment of the present disclosure, there is provided a computer program product. The computer program product comprises a computer readable storage medium having program instructions embodied therewith, the program instructions executable by a processor to cause the processor to manage storage capacity usage in a storage system. The program instructions to cause the processor to manage storage capacity usage in the storage system further comprise program instructions to cause the processor to perform actions of: calculating, for each of a plurality of logical storage arrays in the storage system, a Remaining Time Buffer (RTB) measure indicating time to use up respective free space currently available to the logical storage array. The program instructions to cause the processor to manage storage capacity usage in the storage system further comprise program instructions to cause the processor to perform actions of: adjusting respective free space currently available to each of one or more of the plurality of logical storage arrays so that the RTB measures of the one or more logical storage arrays satisfy a threshold.

According to an embodiment of the computer program product, for each of the plurality of logical storage arrays, the RTB measure is calculated as an average ratio of the respective free space currently available and a respective space consuming speed in a time period.

According to an embodiment of the computer program product, the program instructions to cause the processor to manage storage capacity usage in the storage system further comprise program instructions to cause the processor to perform actions of: calculating, for a controller shared by at least two of the plurality of logical storage arrays, a RTB measure indicating time to use up respective free space currently available to the controller. The threshold is a weighted RTB measure average based on the RTB measures and the space consuming speeds of the controller and of the plurality of logical storage arrays.

According to an embodiment of the computer program product, for each of the plurality of logical storage arrays, the RTB measure is calculated as an instantaneous ratio of the respective free space currently available and a respective space consuming speed on a cycle basis.

According to an embodiment of the computer program product, the threshold is a predetermined value.

According to an embodiment of the computer program product, the program instructions to cause the processor to perform the action of adjusting the respective free space currently available to each of the one or more logical storage arrays further comprise program instructions to cause the processor to perform an action of: determining a destination logical storage array for receiving data migration from the one or more logical storage arrays, wherein the destination logical storage array has a RTB measure satisfies the threshold after reserving at least part of free space currently available to the destination logical storage array for the data migration.

According to an embodiment of the computer program product, the destination logical storage array is from the same tier with the one or more logical storage arrays if persistent extent is to be migrated from the one or more logical storage arrays.

According to an embodiment of the computer program product, the destination logical storage array is from a different tier from the one or more logical storage arrays if dynamic extent or cold extent is to be migrated from the one or more logical storage arrays.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing storage capacity usage in a storage system, the method comprising:
    calculating, for each of a plurality of logical storage arrays in the storage system, a Remaining Time Buffer (RTB) measure indicating time to use up respective free space currently available to the logical storage array, wherein for each of the plurality of logical storage arrays, the RTB measure is calculated as an average ratio of the respective free space currently available and a respective space consuming speed in a time period;
    calculating, for a controller shared by at least two of the plurality of logical storage arrays, a RTB measure indicating time to use up respective free space currently available to the controller; and
    adjusting respective free space currently available to each of one or more of the plurality of logical storage arrays so that RTB measures of the one or more logical storage arrays satisfy a threshold, wherein the threshold is a weighted RTB measure average based on the RTB measures of both of the controller and the plurality of logical storage arrays and the space consuming speeds of both of the controller and the plurality of logical storage arrays.

2. The method of claim 1, wherein for each of the plurality of logical storage arrays, the RTB measure is calculated as an instantaneous ratio of the respective free space currently available and a respective space consuming speed on a cycle basis.

3. The method of claim 2, wherein the threshold is a predetermined value uniform to all logical storage arrays.

4. The method of claim 1, wherein adjusting the respective free space currently available to each of the one or more logical storage arrays comprises:
    determining a destination logical storage array for receiving data migration from the one or more logical storage arrays, wherein the destination logical storage array has a RTB measure that satisfies the threshold after reserving at least part of free space currently available to the destination logical storage array for the data migration.

5. The method of claim 4, wherein the destination logical storage array is from a same tier with the one or more logical storage arrays if a persistent extent is to be migrated from the one or more logical storage arrays.

6. The method of claim 4, wherein the destination logical storage array is from a different tier from the one or more logical storage arrays if a dynamic extent or a cold extent is to be migrated from the one or more logical storage arrays.

7. A computing system, comprising: a processor; and
    a computer-readable memory unit coupled to the processor, the memory unit comprising instructions, when executed by the processor, for managing storage capacity usage in a storage system, wherein the instructions for managing storage capacity usage in the storage system comprise instructions for:
    calculating, for each of a plurality of logical storage arrays in the storage system, a Remaining Time Buffer (RTB) measure indicating time to use up respective free space currently available to the logical storage array, wherein for each of the plurality of logical storage arrays, the RTB measure is calculated as an average ratio of the respective free space currently available and a respective space consuming speed in a time period;
    calculating, for a controller shared by at least two of the plurality of logical storage arrays, a RTB measure indicating time to use up respective free space currently available to the controller; and
    adjusting respective free space currently available to each of one or more of the plurality of logical storage arrays so that RTB measures of the one or more logical storage arrays satisfy a threshold, wherein the threshold is a weighted RTB measure average based on the RTB measures of both of the controller and the plurality of logical storage arrays and the space consuming speeds of both of the controller and the plurality of logical storage arrays.

8. The computing system of claim 7, wherein for each of the plurality of logical storage arrays, the RTB measure is calculated as an instantaneous ratio of the respective free space currently available and a respective space consuming speed on a cycle basis.

9. The computing system of claim 8, wherein the threshold is a predetermined value uniform to all logical storage arrays.

10. The computing system of claim 7, wherein the instructions for adjusting the respective free space currently available to each of the one or more logical storage arrays further comprise instructions for:
    determining a destination logical storage array for receiving data migration from the one or more logical storage arrays, wherein the destination logical storage array has a RTB measure that satisfies the threshold after reserving at least part of free space currently available to the destination logical storage array for the data migration.

11. A computer program product, comprising a computer readable storage medium having program instructions embodied therewith, the program instructions executable by a processor to cause the processor to manage storage capacity usage in a storage system, wherein the program instructions to cause the processor to manage storage capacity usage in the storage system further comprise program instructions to cause the processor to perform actions of:
    calculating, for each of a plurality of logical storage arrays in the storage system, a Remaining Time Buffer (RTB) measure indicating time to use up respective free space currently available to the logical storage array, wherein for each of the plurality of logical storage arrays, the RTB measure is calculated as an average ratio of the respective free space currently available and a respective space consuming speed in a time period;
    calculating, for a controller shared by at least two of the plurality of logical storage arrays, a RTB measure indicating time to use up respective free space currently available to the controller; and
    adjusting respective free space currently available to each of one or more of the plurality of logical storage arrays so that RTB measures of the one or more logical storage arrays satisfy a threshold, wherein the threshold is a weighted RTB measure average based on the RTB measures of both of the controller and the plurality of logical storage arrays and the space consuming speeds of both of the controller and the plurality of logical storage arrays.

12. The computer program product of claim 11, wherein for each of the plurality of logical storage arrays, the RTB measure is calculated as an instantaneous ratio of the respective free space currently available and a respective space consuming speed on a cycle basis.

13. The computer program product of claim 12, wherein the threshold is a predetermined value uniform to all logical storage arrays.

14. The computer program product of claim 11, wherein the program instructions to cause the processor to perform the action of adjusting the respective free space currently available to each of the one or more logical storage arrays further comprise program instructions to cause the processor to perform an action of:
    determining a destination logical storage array for receiving data migration from the one or more logical storage arrays, wherein the destination logical storage array has a RTB measure that satisfies the threshold after reserving at least part of free space currently available to the destination logical storage array for the data migration.

* * * * *